United States Patent
Yannello et al.

(10) Patent No.: US 9,596,830 B2
(45) Date of Patent: Mar. 21, 2017

(54) TOY FOR HORSES AND ANIMALS

(71) Applicants: Frank J Yannello, Centereach, NY (US); Courtney Haubrich, Centereach, NY (US)

(72) Inventors: Frank J Yannello, Centereach, NY (US); Courtney Haubrich, Centereach, NY (US)

( * ) Notice: Subject to any disclaimer, the term of this patent is extended or adjusted under 35 U.S.C. 154(b) by 0 days.

(21) Appl. No.: 14/802,296

(22) Filed: Jul. 17, 2015

(65) Prior Publication Data

US 2017/0013805 A1    Jan. 19, 2017

(51) Int. Cl.
*A01K 15/02*    (2006.01)

(52) U.S. Cl.
CPC .................. *A01K 15/025* (2013.01)

(58) Field of Classification Search
CPC ............... A01K 15/025; A01K 15/026; A01K 39/0106; A01K 5/00; A01K 15/02; A63F 9/0601
USPC .... 119/708, 51.03, 707, 709, 702, 711, 710, 119/61.57, 51.01; D21/468; 273/441, 273/112
See application file for complete search history.

(56) References Cited

U.S. PATENT DOCUMENTS

| | | | | |
|---|---|---|---|---|
| 1,550,438 A * | 8/1925 | Hohmann | .......... | A01K 39/0106 119/51.03 |
| D142,020 S * | 8/1945 | Davidson | ..................... | D21/468 |
| 2,577,309 A * | 12/1951 | Carwile | .................. | A63H 33/00 434/302 |
| 3,578,329 A * | 5/1971 | Biedny | .................. | A63B 67/08 273/119 R |
| 3,581,408 A * | 6/1971 | Mohier | .................. | A63F 9/0876 273/441 |
| 4,004,808 A * | 1/1977 | Gerber | ...................... | A63F 9/02 273/108 |
| 4,205,629 A * | 6/1980 | Wix | ...................... | A01K 5/0114 119/51.5 |
| 5,112,268 A * | 5/1992 | Klaus | .................... | A63F 7/3622 434/258 |
| 5,133,684 A * | 7/1992 | Rhodes | .................. | A63H 33/00 248/153 |
| 5,277,147 A * | 1/1994 | Dupuis | .............. | A01K 39/0106 119/464 |
| 5,551,933 A * | 9/1996 | Washburn | .............. | A63B 23/14 446/170 |
| 5,560,319 A * | 10/1996 | Rising | .................. | A01K 15/025 119/709 |
| 5,887,542 A * | 3/1999 | Sladowski | ......... | A01K 39/0106 119/51.03 |
| 5,924,387 A * | 7/1999 | Schramer | ............. | A01K 15/025 119/708 |
| 6,203,398 B1 * | 3/2001 | Lin | ........................ | A63H 33/00 446/489 |
| 6,318,300 B1 * | 11/2001 | Renforth | .............. | A01K 15/025 119/702 |
| 6,474,260 B1 * | 11/2002 | Shultz | ..................... | A01K 5/00 119/51.03 |

(Continued)

*Primary Examiner* — Yvonne Abbott-Lewis
(74) *Attorney, Agent, or Firm* — The Farrell Law Firm, P.C.

(57) ABSTRACT

A toy for a horse is provided. The toy includes a mounting assembly, a treat guide support that attaches to the mounting assembly, and a treat ring that attaches to the treat guide support. The treat ring is movable relative to the treat guide support when the treat ring is attached thereto.

18 Claims, 3 Drawing Sheets

(56) References Cited

U.S. PATENT DOCUMENTS

| | | | | |
|---|---|---|---|---|
| D481,766 S * | 11/2003 | Kanahele | | D21/468 |
| 6,698,761 B1 * | 3/2004 | Clague | | A63F 7/0088 |
| | | | | 273/112 |
| 6,776,123 B2 * | 8/2004 | Homan | | A01K 15/026 |
| | | | | 119/709 |
| 6,837,037 B2 * | 1/2005 | Willinger | | F16G 13/00 |
| | | | | 59/1 |
| 6,966,277 B2 * | 11/2005 | DeRaspe-Bolles | | A01K 15/025 |
| | | | | 119/702 |
| 7,900,583 B2 * | 3/2011 | Simon | | A01K 15/025 |
| | | | | 119/702 |
| 7,909,003 B2 * | 3/2011 | Willinger | | A01K 15/026 |
| | | | | 119/709 |
| 8,201,521 B2 * | 6/2012 | Shirley | | A01K 5/00 |
| | | | | 119/51.03 |
| 8,371,249 B1 * | 2/2013 | Little | | A01K 15/025 |
| | | | | 119/707 |
| D719,220 S * | 12/2014 | Chase | | D21/398 |
| 9,004,011 B2 * | 4/2015 | Foley | | A01K 15/026 |
| | | | | 119/707 |
| 9,320,206 B2 * | 4/2016 | Ganske | | A47G 7/041 |
| 2004/0126462 A1 * | 7/2004 | Tepper | | A01K 15/026 |
| | | | | 426/89 |
| 2004/0185949 A1 * | 9/2004 | Bromley | | A01K 15/025 |
| | | | | 472/135 |
| 2006/0201445 A1 | 9/2006 | Stonier | | |
| 2009/0004338 A1 * | 1/2009 | Anderson | | A01K 15/026 |
| | | | | 426/92 |
| 2009/0111351 A1 * | 4/2009 | Krochak | | A63F 9/34 |
| | | | | 446/137 |
| 2011/0005469 A1 | 1/2011 | Dean | | |
| 2011/0136404 A1 * | 6/2011 | Silverglate | | A63H 33/04 |
| | | | | 446/489 |

* cited by examiner

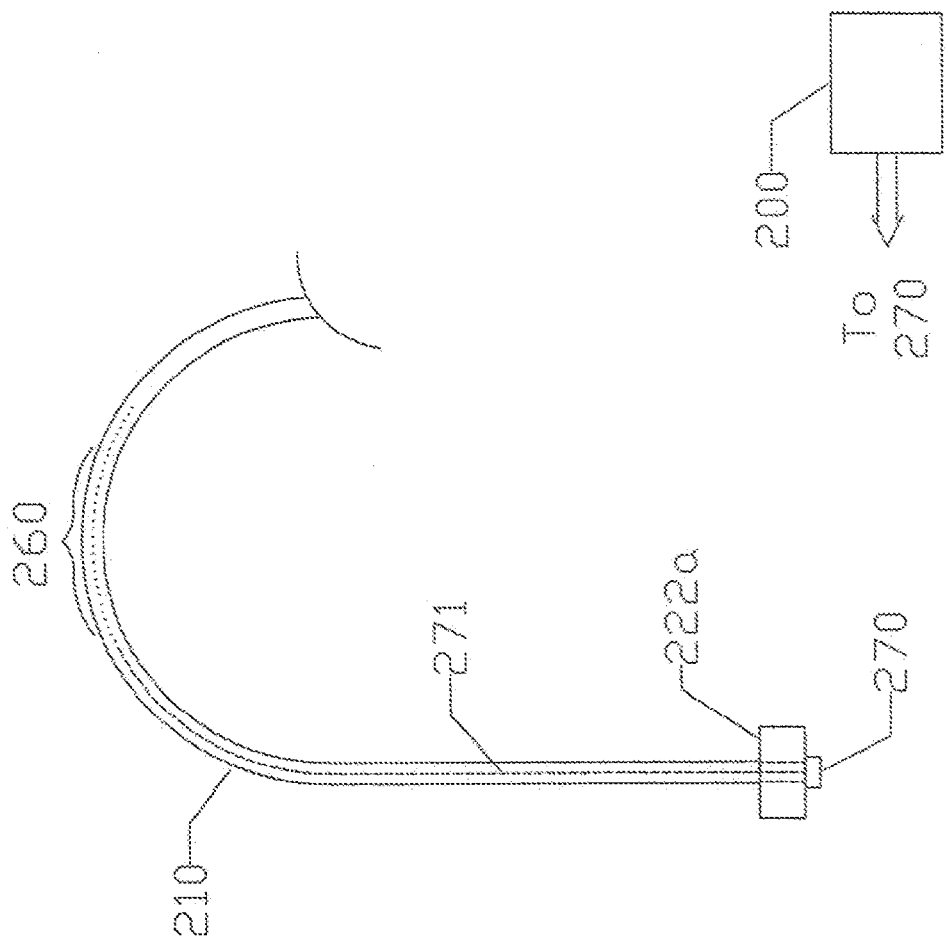

TOY FOR HORSES AND ANIMALS

BACKGROUND

Field of the Disclosure

The present disclosure relates generally to devices for entertainment and enrichment for horses, and more particularly, to a horse toy that is removably mountable to a support structure.

Description of the Related Art

Horses are intelligent animals that welcome opportunities to play and stay occupied. Horses are typically grazing animals by nature and would graze most of the time if given the opportunity. Unfortunately, domestic horses typically spend a considerable amount of time standing in their stalls waiting to be fed. After feeding, there is little opportunity for the horses to amuse themselves while confined to the stall. Horses can become bored and destructive to self and property when confined.

To combat boredom, various play things, or toys, have been designed for the horse to pick up and hold in its mouth, or to push with its nose or hoofs. Such play toys have been designed to occupy horses in some sort of activity, such as chewing, gnawing, or butting and pushing.

For example, stuffed play toys, such as stuffed human-looking dolls, and dog-like or cat-like dolls, have been used, but these stuffed toys do not maintain a horse's interest, as they are not durable enough, nor do they provide a proper grasping surface for the horse. Additionally, a young, or even an older horse can gag on many of the appendages of such doll-like toys.

Accordingly, there is a need for a horse toy that is durable and won't cause accidental harm to the horse.

SUMMARY

As can be appreciated, a horse toy that is removably mountable to a support structure may prove useful in the equine entertainment industry.

Embodiments of the present disclosure are described in detail with reference to the drawing figures wherein like reference numerals identify similar or identical elements. As used herein, the term "distal" refers to the portion that is being described which is further from a user, while the term "proximal" refers to the portion that is being described which is closer to a user.

In accordance with an aspect of the present disclosure, there is provided a toy for a horse. The toy includes a mounting assembly, a treat guide support that attaches to the mounting assembly, and a treat ring that attaches to the treat guide support. The treat ring is movable relative to the treat guide support when the treat ring is attached thereto.

In accordance with another aspect of the present disclosure, there is provided a support for a treat ring for a horse. The support includes a mounting assembly and a treat guide support that attaches to the mounting assembly and supports the treat ring such that the treat ring is both slidable and rotatable relative to the treat guide support.

BRIEF DESCRIPTION OF THE DRAWING

Various embodiments of the present disclosure are described hereinbelow with references to the drawings, wherein:

FIG. 3 is a diagram illustrating a treat guide support, in accordance with an embodiment of the present disclosure.

DETAILED DESCRIPTION

Detailed embodiments of the present disclosure are disclosed herein; however, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

As noted above, a horse toy that is removably mountable to a support structure may prove useful in the equine entertainment industry, and such a toy is described herein.

Figure 1:
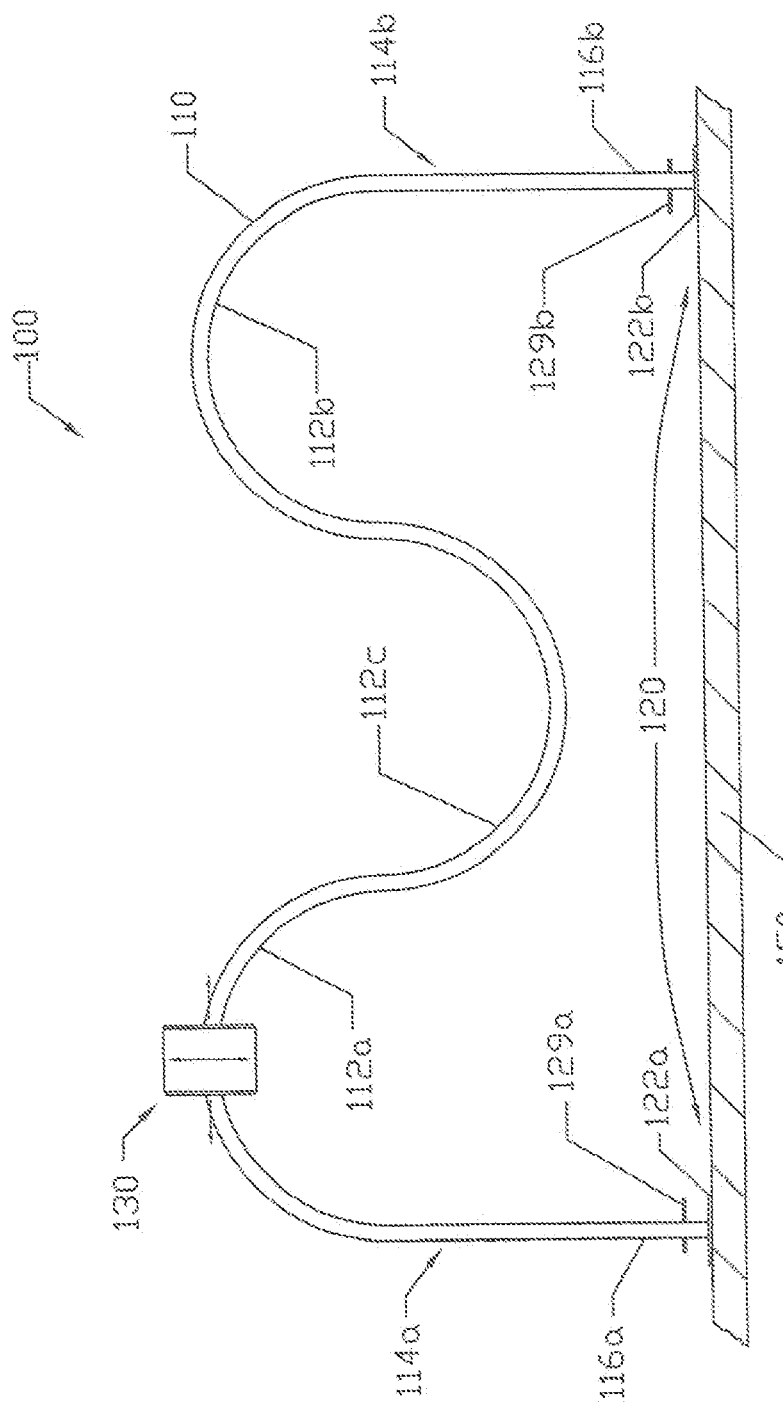
FIG. 1 is a top view of a horse toy including a mounting assembly, a treat guide support, and treat ring, in accordance with an embodiment of the present disclosure.

FIG. 1 is a top view of a horse toy 100 including a treat guide support 110, a mounting assembly 120, and a treat ring 140, in accordance with an embodiment of the present disclosure.

The treat guide support 110 includes one or more curved portions and one or more straight portions. In the illustrated embodiment, the treat guide support is shown including three curved portions 112a-112c and two straight portions 114a, 114b. The curved portions 112a, 112b include a generally concave configuration, while the curved portion 112c includes a generally convex configuration.

The curved portions 112a-112c are configured to make it more difficult for a horse to move the treat ring 120 along the treat guide support 110, thereby maintaining a horse's interest (or amusing a horse) for a long period of time. As can be appreciated, more or fewer curved portions or straight portions can be provided on the treat guide support 120; this of course will depend on a manufacturer's or user's preference. Moreover, while the treat guide support 120 is shown having a symmetrical configuration, the present disclosure is not so limited.

The treat guide support 110 can be made from any suitable material including, but not limited to, metal, metal alloy, hard rubber, plastic, or combinations thereof.

The treat guide support 110 includes two connecting ends 116a, 116b which are disposed at proximal ends on the straight portions 114a, 114b. Each of the connecting ends 116a, 116b is substantially hollow and includes corresponding apertures 118a, 118b (shown in phantom in FIG. 2) that extend through the opposite sides of the connecting ends 116a, 116b.

Figure 2:
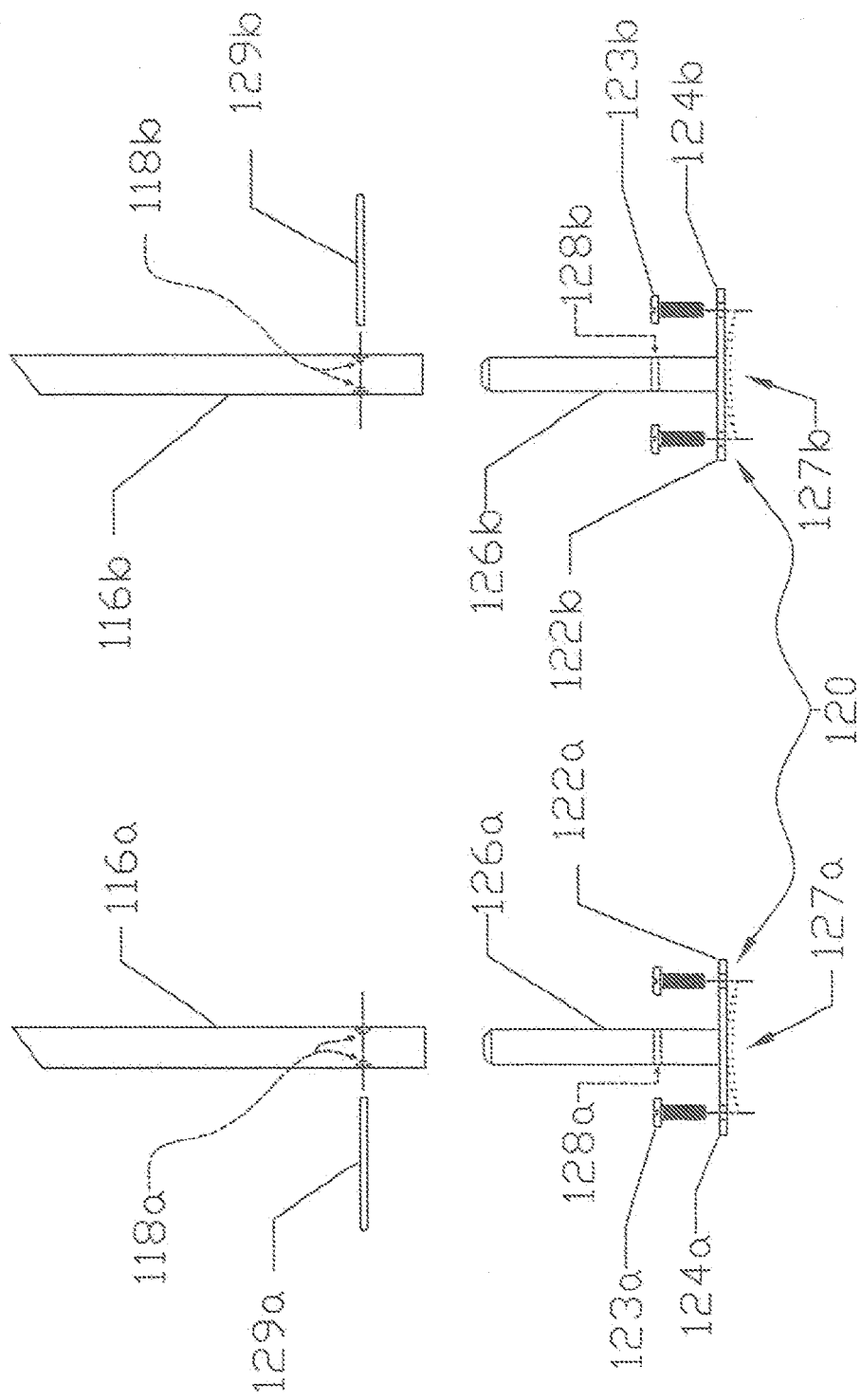
FIG. 2 is a side view illustrating connecting ends of the treat guide support and the mounting assembly in an unassembled configuration.

FIG. 2 is a side view illustrating the connecting ends 116a, 116b of the treat guide support 110 and the mounting assembly 120 in an unassembled configuration.

The mounting assembly 120 includes two mounting brackets 122a, 122b that are configured to attach to a support structure 150, e.g., a stall or barn wall, for supporting the treat guide support 110 in a substantially fixed orientation along a horizontal axis when the treat guide support 110 is attached to the mounting assembly 120. To this end, each of the mounting brackets 122a and 122b includes respective base portions 124a, 124b which are configured to support thereon corresponding posts 126a, 126b.

Each of the posts 126a, 126b is configured to be received within the connecting ends 116a and 116b of the treat guide support 110. Each of the posts 126a, 126b has a length that is approximately equal to a length of the straight portions 114a, 114b of the treat guide support 110. Providing the posts 126a, 126b with such a length (i.e., that is approximately equal to a length of the straight portions 114a, 114b) adds rigidity to the treat guide support 110 when the treat guide support 110 is attached to the mounting assembly 120, thereby facilitating in maintaining the treat guide support 110 in the substantially fixed orientation along a horizontal axis.

Continuing with reference to FIG. 2, each of the posts 126a, 126b has extending therethrough an aperture 128a and 128b. The apertures 128a, 128b are alignable with the apertures 118a and 118b of the connecting ends 116a, 116b when the posts 126a, 126b are received within the connecting ends 116a, 116b. With the posts 126a, 126b received within the connecting ends 116a, 116b, locking pins 129a, 129b of the mounting assembly 120 can be inserted through the apertures 118a, 118b of the connecting ends 116a, 116b and the apertures 128a, 128b of the posts 126a, 126b to lock the treat guide support 110 to the mounting assembly 120 (see FIGS. 1 and 2, for example).

Pairs of fasteners 123a, 123b are used to connect the mounting brackets 122a, 122b to the support structure 150. The fasteners 123a, 123b can include, but is not limited to, screws, nails, nuts and bolts, or other suitable fastening devices.

The treat ring 130 includes a generally cylindrical configuration. The treat ring 130 may be formed from any food that is suitable for horse consumption. For example, the treat ring 130 may be formed of a mixture of compressed oats, ground hay, horse feed, various berries, etc. In the formed configuration, the treat ring 130 has a donut-like shape with an aperture extending through it. The diameter of the aperture of the treat ring is larger than a diameter of the treat guide support, which allows the treat ring 130 to move easily along the length of the treat guide support 110. Treat rings for horses are known in the art, and as such a detailed description thereof is omitted for brevity.

In use, a user can mount the mounting brackets 122a, 122b to the support structure 150. The treat ring 130 can be positioned on the treat guide support 110 via sliding the one of the connecting ends 116a, 116b through the aperture of the treat ring 130. Once the treat ring is positioned on the treat guide support 110, each of the connecting ends 116a, 116b can be placed over a corresponding one of the posts 126a, 126b, and the locking pins 129a and 129b can then be inserted through the aligned apertures 118a, 118b, and 128a, 128b to lock the treat guide support 110 to the mounting assembly 120.

Once the horse toy 100 is assembled, the horse can enjoy many hours moving (and eating) the treat ring 130 along the curved portions 112a-112c (and/or the straight portions 114a, 114b) of the treat guide support 110. After the horse has eaten the treat ring 130, a user can position another treat ring 130 on the treat guide support 110.

Because the treat ring 130 slides along and rotates about the treat guide support 110, a time that it takes the horse to eat the treat ring 130 is increased (as opposed to a treat ring that is maintained in a fixed configuration), thereby maintaining a horse's attention for long periods of time. Additionally, as the treat ring 130 is formed from food that is suitable for consumption by a horse and is supported on the treat guide support 110, the likelihood of the horse gagging or choking on the treat ring 130 is reduced, if not eliminated.

From the foregoing and with reference to the various figure drawings, those skilled in the art will appreciate that certain modifications can also be made to the present disclosure without departing from the scope of the same. For example, the treat guide support 110 can be separable along a length thereof, thereby allowing a user to change the treat ring 130 as needed, without having to remove one of the connecting ends 116a, 116b from their respective mounting brackets 122a, 122b. For example, the treat guide support 110 can be separable along a center portion of the curved portion 112c. In this instance, one half of the curved portion 112c can include a hollow configuration and the other half of the curved portion 112c can include a post extending therefrom that can be received within the hollow curved portion 112c, similar to the connection method used to connect the connecting ends 116a, 116b to the posts 126a, 126b.

Moreover, while the mounting brackets 122a, 122b have been described herein as using fasteners that may require penetrating the support structure 150, other fastening devices may be used. For example, the mounting brackets 122a, 122b can be provided with suction cups that are configured to removably attach to the support structure 150. For illustrative purposes, the suction cups 127a, 127b are shown in phantom in FIG. 2.

Additionally, it may prove advantageous to provide a treat guide support 210 with the capability of providing water to the horse. In this instance, one or more apertures 260 may be provided along a portion of the treat guide support 210. In FIG. 3, for example, a plurality of apertures 260 is shown disposed on the treat guide support 210. A water supply 200, which connects to a hose (not shown) that connects to a port 270 on the mounting bracket 222a, can be configured to supply water to the treat guide support 210. In this embodiment, the port 270 is in fluid communication with the treat guide support 210, which includes at least one lumen or channel 271 (shown by the dashed lines) that extends through the treat guide support 210 and to the plurality of apertures 260. As can be appreciated, one or more other modifications may have be made to the treat guide support 210 and/or the mounting bracket 222a in order to provide the treat guide support 210 with the capability off providing water to the horse.

Further, a non-edible treat ring, which can be made from any suitable material, e.g., plastic, may be used instead of the edible treat ring 130 herein described. For example, the non-edible treat ring can be formed of a plastic housing (which has the same generally shape as the treat ring 130) that is configured to dispense horse food as the non-edible treat ring is moved along the treat guide 110. In this instance, the non-edible treat ring can include a plurality of apertures that are configured to dispense horse treats as the non-edible treat ring is slid and rotated along the treat guide support 110.

While the present disclosure describes toys relating to horses, the present disclosure is not so limited. For example, the horse toy 100 can be modified to suit the needs of other domesticated animals (or wild animals). For example, a smaller version of the horse toy can be used for entertaining other domesticated animals including, but not limited to, cats, dogs, mice, gerbils, etc. As can be appreciated, certain modifications may need to be made to the horse toy to accommodate the type of animal. For example, a dog toy may include a treat ring that is formed of compressed food that is suitable for a dog. In this embodiment, providing the mounting brackets with suction cups may prove advantageous, as it would not require a user to make holes in their home. In the instance where the horse toy is modified to accommodate a caged animal, such as a gerbil, the treat ring can be modified accordingly, and the mounting brackets can be configured to attach to portion of the cage.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A toy for a horse comprising:
a mounting assembly;
a treat guide support that attaches to the mounting assembly; and
a treat ring that attaches to the treat guide support,
wherein the treat ring is movable relative to the treat guide support when the treat ring is attached thereto,
wherein the treat guide support includes two connecting ends each configured to receive respective posts on the mounting brackets, and
wherein the two connecting ends of the treat guide support have respective apertures that are alignable with respective apertures on the posts of the mounting brackets when the posts of the mounting brackets are received within the connecting ends of the treat guide support.

2. The toy according to claim 1, wherein the mounting assembly includes a pair of mounting brackets that are attachable to a support structure.

3. The toy according to claim 2, wherein the pair of mounting brackets are attachable to the support structure via one of screws, nuts and bolts, nails, and a suction cup configuration.

4. The toy according to claim 2, wherein the treat guide support attaches to the mounting assembly via a retaining pin.

5. The toy according to claim 1, wherein the retaining pin is positionable through the apertures of the two connecting ends of the treat guide support and the apertures on the posts of the mounting brackets when the posts of the mounting brackets are received within the connecting ends of the treat guide support and the apertures of the two connecting ends of the treat guide support and the apertures on the posts of the mounting brackets are aligned.

6. The toy according to claim 1, wherein the treat ring is slidable along and rotatable about the treat guide support.

7. The toy according to claim 1, wherein the treat ring is formed of compressed horse treats.

8. The toy according to claim 1, wherein the treat guide support includes at least one curved portion and at least one straight portion.

9. The toy according to claim 1, wherein the treat guide support is formed from a material selected from the group consisting of metal, metal alloy, rubber, and plastic.

10. A support for a treat ring for a horse, the support comprising:
a mounting assembly; and
a treat guide support that attaches to the mounting assembly and supports the treat ring such that the treat ring is both slidable and rotatable relative to the treat guide support,
wherein the treat guide support includes two connecting ends each configured to receive respective posts on the mounting brackets, and
wherein the two connecting ends of the treat guide support have respective apertures that are alignable with respective apertures on the posts of the mounting brackets when the posts of the mounting brackets are received within the connecting ends of the treat guide support.

11. The support according to claim 10, wherein the mounting assembly includes a pair of mounting brackets that are attachable to a support structure.

12. The support according to claim 11, wherein the pair of mounting brackets are attachable to the support structure via one of screw, nuts and bolts, nails, and a suction cup configuration.

13. The support according to claim 11, wherein the treat guide support attaches to the mounting assembly via a retaining pin.

14. The support according to claim 10, wherein the retaining pin is positionable through the apertures of the two connecting ends of the treat guide support and the apertures on the posts of the mounting brackets when the posts of the mounting brackets are received within the connecting ends of the treat guide support and the apertures of the two connecting ends of the treat guide support and the apertures on the posts of the mounting brackets are aligned.

15. The support according to claim 10, wherein the treat guide support includes at least one curved portion and at least one straight portion, and
wherein the treat guide support is formed from a material selected from the group consisting of metal, metal alloy, rubber and plastic.

16. A toy for a horse comprising:
a mounting assembly;
a treat guide support that attaches to the mounting assembly; and
a treat ring that attaches to the treat guide support,
wherein the treat ring is movable relative to the treat guide support when the treat ring is attached thereto, and
wherein the treat ring is formed of a plastic housing that configured to house and dispense horse treats as the treat ring is moved relative to the treat guide support.

17. A toy for a horse comprising:
a mounting assembly;
a treat guide support that attaches to the mounting assembly; and
a treat ring that attaches to the treat guide support,
wherein the treat ring is movable relative to the treat guide support when the treat ring is attached thereto,
wherein the treat guide support is separable along a portion thereof when the treat guide support is attached to the mounting assembly.

18. A support for a treat ring for a horse, the support comprising:
a mounting assembly; and
a treat guide support that attaches to the mounting assembly and supports the treat ring such that the treat ring is both slidable and rotatable relative to the treat guide support,
wherein the treat guide support is separable along a portion thereof when the treat guide support is attached to the mounting assembly.

* * * * *